(12) United States Patent
Jha et al.

(10) Patent No.: US 12,343,876 B2
(45) Date of Patent: Jul. 1, 2025

(54) SYSTEM AND METHOD FOR CONTROLLING A ROBOT USING CONSTRAINED DYNAMIC MOVEMENT PRIMITIVES

(71) Applicant: Mitsubishi Electric Research Laboratories, Inc., Cambridge, MA (US)

(72) Inventors: Devesh Jha, Cambridge, MA (US); Seiji Shaw, Providence, AL (US); Arvind Raghunathan, Medford, AL (US); Radu Ioan Corcodel, Quincy, AL (US); Diego Romeres, Boston, AL (US); Daniel Nikovski, Brookline, AL (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 358 days.

(21) Appl. No.: 17/931,954

(22) Filed: Sep. 14, 2022

(65) Prior Publication Data
US 2024/0083029 A1   Mar. 14, 2024

(51) Int. Cl.
*B25J 9/16* (2006.01)

(52) U.S. Cl.
CPC ........... *B25J 9/1666* (2013.01); *B25J 9/161* (2013.01); *B25J 9/163* (2013.01); *G05B 2219/39244* (2013.01); *G05B 2219/40116* (2013.01)

(58) Field of Classification Search
CPC . B25J 9/1666; B25J 9/161; B25J 9/163; B25J 9/1602; G05B 2219/40107;
(Continued)

(56) References Cited

U.S. PATENT DOCUMENTS 9,486,918 B1 * 11/2016 Earl .................... B25J 9/163
10,913,154 B2    2/2021 Tan et al.

FOREIGN PATENT DOCUMENTS

CN       111633646 A  *  9/2020  ............. B25J 9/16
CN       115488881 A  * 12/2022

OTHER PUBLICATIONS

Saveriano et al., "Dynamic Movement Primitives in Robotics: A Tutorial Survey", Feb. 7, 2021, retrieved from internet, URL: <https://arxiv.org/pdf/2102.03861> (Year: 2021).*

(Continued)

*Primary Examiner* — Thomas E Worden
*Assistant Examiner* — Benjamin J Brosh
(74) *Attorney, Agent, or Firm* — Gene Vinokur

(57) ABSTRACT

A controller for controlling an operation of a robot to execute a task is provided. The controller comprises a memory configured to store a set of dynamic movement primitives (DMPs) associated with the task. The set of DMPs comprise a set of at least two dynamical systems: a function representing point attractor dynamics and a forcing function corresponding to a learned demonstration of the task. The controller comprises a processor configured to transform the set of DMPs to a set of constrained DMPs (CDMPs) by determining a perturbation function associated with the forcing function. The perturbation function is associated with a set of operational constraints. The processor is further configured to solve, a non-linear optimization problem for the set of CDMPs based on the set of operational constraints and generate, a control input for controlling the robot for executing the task, based on the solution.

21 Claims, 15 Drawing Sheets

(58) Field of Classification Search
CPC ........ G05B 2219/517; G05B 2219/518; G05B 2219/519; G05B 2219/521; G05B 2219/39244; G05B 2219/40116; G05B 2219/43163
See application file for complete search history.

(56) References Cited

OTHER PUBLICATIONS

Gams et al., "Adaptation and Coaching of Periodic Motion Primitives Through Physical and Visual Interaction", Sep. 25, 2015, retrieved from internet, URL: <https://www.sciencedirect.com/science/article/pii/S0921889015001992> (Year: 2015).*

Rai et al., "Learning Feedback Terms for Reactive Planning and Control", Mar. 3, 2017, retrieved from internet, URL: <https://arxiv.org/pdf/1610.03557> (Year: 2017).*

Lu et al., "A Constrained DMPs Framework for Robot Skills Learning and Generalization From Human Demonstrations", Feb. 4, 2021, retrieved from internet, URL: <https://ieeexplore.ieee.org/document/9347805> (Year: 2021).*

Reimann et al., "End Effector Obstacle Avoidance Using Multiple Dynamic Variables", Jun. 1, 2011, retrieved from internet, URL: <https://ieeexplore.ieee.org/document/5756798> (Year: 2011).*

Gams et al., "Task-Specific Generalization of Discrete and Periodic Dynamic Movement Primitives", Nov. 2010, retrieved from internet, URL: <https://www.researchgate.net/publication/224175918_Task-Specific_Generalization_of_Discrete_and_Periodic_Dynamic_Movement_Primitives> (Year: 2010).*

Stavridis et al. "Pick and Place in Dynamic Environments with a Mobile Dual Arm Robot Equipped with Distributed Distance Sensors", Jul. 19, 2021, retrieved from internet, URL: <https://ieeexplore.ieee.org/stamp/stamp.jsp?arnumber=9555672> (Year: 2021).*

Ginesi et al., "Dynamic Movement Primitives: Volumetric Obstacle Avoidance Using Dynamic Potential Functions", Mar. 30, 2021, retrieved from internet: URL: <https://link.springer.com/article/10.1007/s10846-021-01344-y> (Year: 2021).*

Jiang et al., "Mobile Robot Path Planning Based on Dynamic Movement Primitives", Sep. 11, 2017, retrieved from internet, URL :<https://ieeexplore.ieee.org/document/8028446> (Year: 2017).*

Tu et al., "Whole-Body Control for Velocity-Controlled Mobile Collaborative Robots Using Coupling Dynamic Movement Primitives", Mar. 7, 2022, retrieved from internet, URL: <https://arxiv.org/pdf/2203.03296> (Year: 2022).*

Park et al., "Movement Reproduction and Obstacle Avoidance with Dynamic Movement Primitives and Potential Fields", Feb. 20, 2009, retrieved from internet, URL: <https://ieeexplore.ieee.org/document/4755937> (Year: 2009).*

Saveriano et al., "Merging Position and Orientation Motion Primitives", Mar. 25, 2020, retrieved from internet, URL: <https://arxiv.org/pdf/2003.11507> (Year: 2020).*

Duan et al., "Constrained DMPs for Feasible Skill Learning on Humanoid Robots", Jan. 24, 2019, retrieved from internet, URL: <https://ieeexplore.ieee.org/document/8624934?source=IQplus> (Year: 2019).*

English Translation of CN-111633646-A using ESPACENET (wherein any relevant citations within the accompanying Office action pertaining to this reference utilize the paragraph numbering of this NPL) (Year: 2020).*

English Translation of CN-115488881-A using ESPACENET (wherein any relevant citations within the accompanying Office action pertaining to this reference utilize the paragraph numbering of this NPL) (Year: 2022).*

* cited by examiner $$\underbrace{\ddot{y}}_{108} = \underbrace{\alpha[\beta(g-y)-\dot{y}]}_{109} + \underbrace{f(x,g)}_{110}$$

FIG. 2B

$$f(x,g) = \frac{\sum_{i=1}^{N} \psi_i w_i^T}{\sum_{i=1}^{N} \psi_i} x(g - y_0)$$

110 — $f(x,g)$
111 — Weights (learned from demonstration)
112

FIG. 2C

$$\psi_i = \exp[-h_i(x - c_i)^2]$$

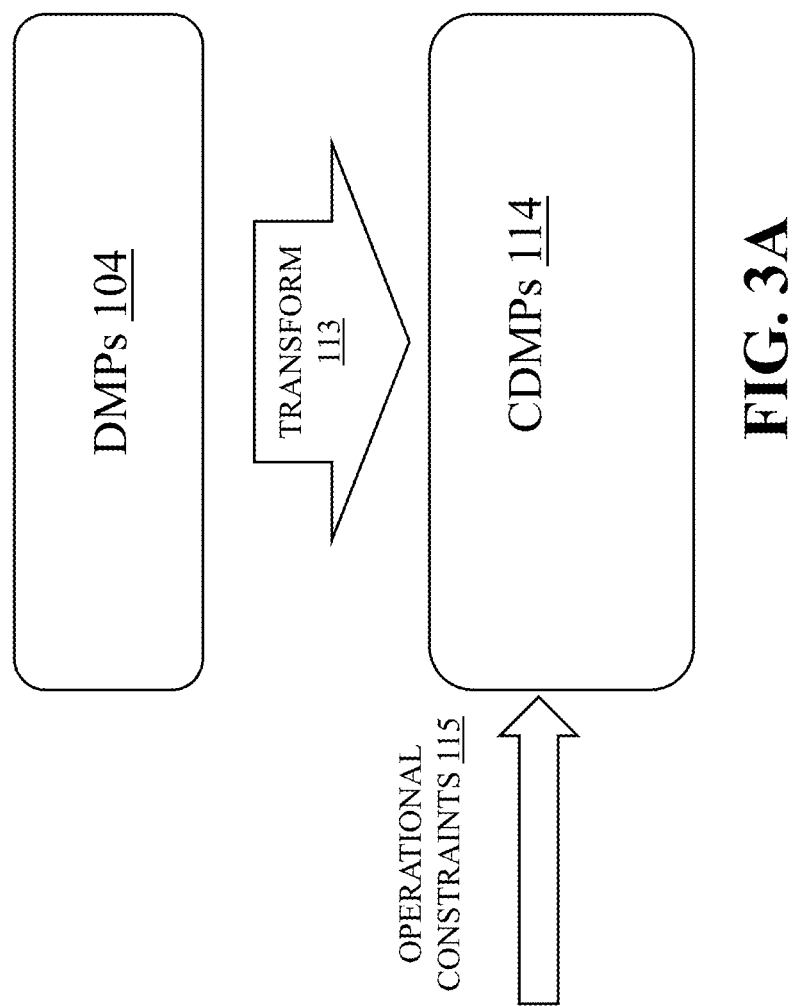

$$\underbrace{f(x,g)}_{110} + g(x) = \underbrace{\frac{\sum_{i=1}^{N} \psi_i (w_i - \zeta_i)}{\sum_{i=1}^{N} \psi_i}}_{117} x(g - y_0)$$

FIG. 3C

SYSTEM AND METHOD FOR CONTROLLING A ROBOT USING CONSTRAINED DYNAMIC MOVEMENT PRIMITIVES

TECHNICAL FIELD

The present disclosure relates generally to robotic operation and movement, and more particularly to a method and a system for constrained robotic operation and movement.

BACKGROUND

Various types of robotic devices are developed for performing a variety of operations such as material handling, transportation, welding, assembly, and the like. Learning from demonstration also known as robot programming by demonstration are commonly used techniques for enabling robots to autonomously perform new tasks. These techniques assume that an appropriate robot controller can be derived from observations of a human's own performance thereof or of a human teleoperating a robot for the desired task. Dynamic Movement Primitives (DMP)-based techniques are widely used for learning skills which can be demonstrated to a robot by a skilled human or controller. The DMPs are a nonlinear dynamical system formulation that can learn complex trajectories from demonstrations by decoupling a nonlinear forcing function from the nominal attraction behaviour. The DMP-based techniques provide for generalization capabilities and simple formulation. Further, the DMPs can be re-parameterized by their start and goal positions.

However, a direct control over executed trajectory in between the start and the goal positions (poses) may be difficult. As such, the DMP-based techniques may lead to undesirable behaviour in the presence of constraints. Without care, a new start or goal position may cause the robot to collide with itself or the environment (i.e., an obstacle) or extend past its own joint limits. When a possibility of collision occurs, for example due to change of the environment for performing a task from the environment of demonstrating the task, the traditional DMP-based techniques tend to correct the trajectory estimated based on the skills learned from the demonstration. However, such a correction is computationally expensive, impractical, and may be even impossible when the generated trajectory severely violates the constraints.

Accordingly, there is a need for a system and a method for incorporating constraints during a task, such as trajectory generation, for robots using learning from demonstration, in an efficient and an effective way.

SUMMARY

It is an object of some embodiments to provide a system and a method for constrained control of robots. Specifically, it is an objective of some embodiments to provide a system and a method for constrained control of robotic manipulators using skills learned from a demonstration. Additionally, or alternatively, it is an object of some embodiments to incorporate constraints during execution of a task by a robot, for example during trajectory generation for robots using learning from demonstration.

Additionally, or alternatively, it is an object of some embodiments to provide such a system and a method that can provide constrained control of a robot, specifically a robotic manipulator, in a presence of different types of constraints, such as collision avoidance with the environment, joint limits, self-collision.

Some embodiments are based on understanding that the skills demonstrated to the robot are performed offline in an environment that can be different from the environment during the actual control of the robot. Also, in the DMP framework, the learned skills are captured using a forcing function representing forces acting on the dynamical system during the demonstration that allows it to follow the demonstrated trajectory. The forcing function is a mathematical representation of the skill that was demonstrated to the robot in the demonstrated trajectory. While these forces can be applied in the environment, after the forcing function is learned, the forcing function is independent of the environment. To that end the natural way to consider constraints is external to the forcing function independent from the environment. Moreover, relearning the forcing function for different environments of robotic manipulation is impractical.

However, some embodiments are based on the realization that the forcing function can be adapted for different environments without the need to relearn it. Such an adaptation allows making constraints internal part of the skill rather than the correction performed outside of the skill. To do so, some embodiments aim to find a minimum correction to predefined weights of the basis function forming the forcing function that would result in the new forcing function satisfying the constraints in the new environment.

Such a formulation is different from learning new weights because while the weights define the skill, the correction to the weights defines the environment and/or adaptation of the skills to a new environment. Hence, the unknown corrections are dependent on the environment but independent from the skill itself, which simplifies the adaptation and allows to consider different types of constraints. In addition, finding the correction incorporates the constraints inside the forcing function making the constraints intrinsic to the skills without relearning process. In such a manner, different legacy methods for controlling based on DMPs may be reused for new environments.

For example, the correction to the skill for adapting the skill to the environment can be represented as additional parameters in the original formulation of the DMPs. These additional parameters can be optimized using an optimization problem that can be solved using an off-the-shelf solver.

To that end, the additional parameters in the original formulation of DMPs, define correction in the weights of the basis functions that can be estimated using an optimization method so that the DMPs can then satisfy certain constraints. This leads to transformation of the DMPs to constrained DMPs using the corrections in the weights as perturbations in the original forcing function, which can be represented by a non-linear optimization problem. The non-linear optimization problem is solved to identify these perturbations, and thereafter to identify control inputs for the robots to perform the task under constrained conditions.

To that end, in one embodiment, a method of controlling a robot for executing a task is disclosed. The method is executed by a processor coupled with a memory, wherein the memory stores a set of dynamic movement primitives (DMPs) associated with the task, wherein the set of DMPs comprise a set of at least two dynamical systems, the set of the at least two dynamical systems comprising at least: a function representing point attractor dynamics associated with the task and a forcing function associated with a learned demonstration of the task. The processor comprises stored instructions, which when executed by the processor, conduct steps of the method comprising obtaining the set of DMPs associated with the task. The obtained set of DMPs is then transformed to a set of constrained DMPs (CDMPs) by defining a perturbation function associated with the learned forcing function, such that the perturbation function is associated with a set of operational constraints that need to be satisfied for performance of the task. Further, a non-linear optimization problem is solved for the set of CDMPs based on the operational constraints. Further a control input is generated for controlling the robot for executing the task, based on the solution of the non-linear optimization problem for the set of CDMPs.

According to another embodiment, controller for controlling an operation of a robot to execute a task is provided. The controller comprises a memory configured to store a set of dynamic movement primitives (DMPs) associated with the task, wherein the set of DMPs comprise a set of at least two dynamical systems. The set of two dynamical systems comprising at least: a function representing point attractor dynamics associated with the task; and a forcing function associated with a learned demonstration of the task. The controller further comprises a processor configured to: transform, the set of DMPs to a set of constrained DMPs (CDMPs) by determining a perturbation function associated with the learned forcing function, such that the perturbation function is associated with a set of operational constraints that need to be satisfied for the execution of the task; solve, a non-linear optimization problem for the set of CDMPs based on the set of operational constraints; and generate, a control input for controlling the robot for executing the task, based on the solution of the non-linear optimization problem for the set of CDMPs. The controller further comprises an output interface configured to command the robot to execute the generated control input to execute the task.

According to yet another embodiment, a non-transitory computer-readable medium storing computer-executable instructions for executing a task by a robot is disclosed. The computer-executable instructions may be configured for obtaining a set of DMPs associated with the task, wherein the set of DMPs comprise a set of at least two dynamical systems. The set of the at least two dynamical systems comprising at least: a function representing point attractor dynamics associated with the task, and a forcing function associated with a learned demonstration of the task. The computer-executable instructions may be further configured for transforming, the set of DMPs to a set of constrained DMPs (CDMPs) by defining a perturbation function associated with the learned forcing function, such that the perturbation function is associated with a set of operational constraints that need to be satisfied for performance of the task. The computer-executable instructions are further configured for solving, a non-linear optimization problem for the set of CDMPs based on the operational constraints. Additionally, the computer-executable instructions are configured for generating, a control input for controlling the robot for executing the task, based on the solution of the non-linear optimization problem for the set of CDMPs.

It is to be understood that both the foregoing general description and the following detailed description are exemplary and explanatory only and are not restrictive of the invention, as claimed.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 2B illustrates a mathematical formulation corresponding to a dynamical system represented by the set of DMPs of FIG. 2A, in accordance with an embodiment of the present disclosure.

FIG. 2C illustrates a mathematical formulation corresponding to a forcing function represented by the set of DMPs of FIG. 2A, in accordance with an embodiment of the present disclosure.

FIG. 2D illustrates a mathematical formulation corresponding to a basis function represented by the set of DMPs of FIG. 2A, in accordance with an embodiment of the present disclosure.

FIG. 3A illustrates a block diagram showing transformation of the set of DMPs to a set of constrained DMPs (CDMPs), in accordance with an embodiment of the present disclosure.

FIG. 3C illustrates a mathematical representation showing barrier function usage in the perturbation function of FIG. 3B, in accordance with an embodiment of the present disclosure.

DETAILED DESCRIPTION

Figure 1A:
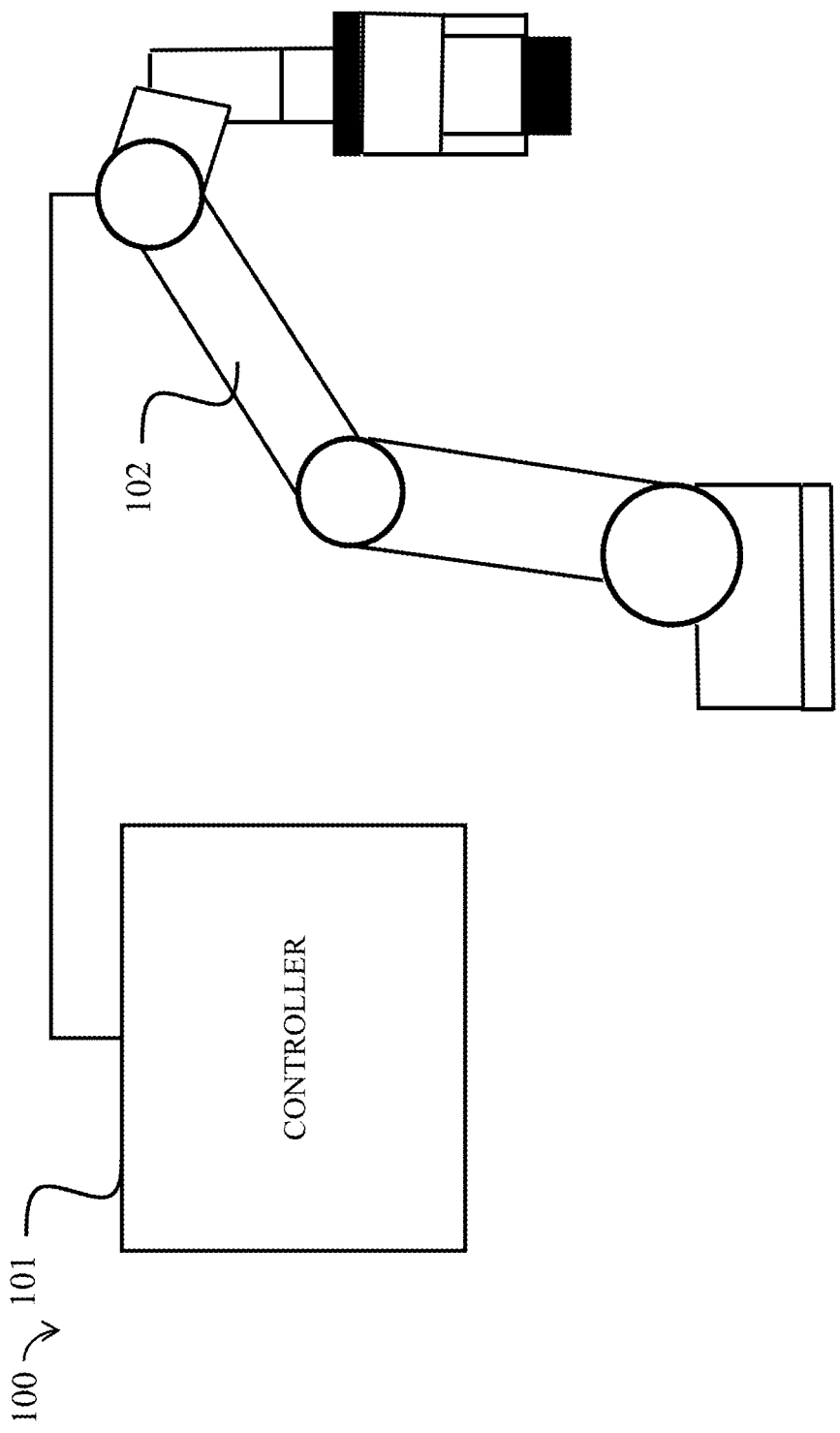
FIG. 1A illustrates a block diagram of a system including a controller for controlling an operation of a robot to execute a task, in accordance with an embodiment of the present disclosure.

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Various embodiments disclosed herein provide transformation of DMP-based techniques to CDMP-based techniques for implementation of constraints in tasks performed by a robot. The DMP-based techniques are based on learned skills captured using a forcing function representing forces acting on a dynamical system representing the task during a demonstration of the task by a skilled user. This allows the robot to follow the demonstrated task. The forcing function is a mathematical representation of the skill that was demonstrated to the robot in the demonstrated task. While these forces can be applied in the environment after the forcing function is learned, the forcing function is independent of the environment. In other words, the constraints are external to the forcing function independent from the environment. Relearning the forcing function for different environments of the robot is impractical.

Some embodiments are based on the realization that the forcing function may be adapted for different environments without the need to relearn it. Such an adaptation allows making constraints internal part of the skill rather than the correction performed outside of the skill. To this end, an objective of the present disclosure is to find a minimum correction to predefined weights of basis functions forming the forcing function that would result in the new forcing function satisfying the constraints in the new environment.

Some embodiments are further based on the realization that, the above methodology is different from learning new weights because while the weights define the skill, the correction to the weights defines the environment and/or adaptation of the skills to a new environment. Hence, the unknown corrections are dependent on the environment but independent from the skill itself. This simplifies the adaptation and allows to consider different types of constraints. In addition, finding the correction incorporates the constraints inside the forcing function making the constraints intrinsic to the skills without relearning the process. In such a manner, different legacy methods for controlling based on DMPs can be reused for new environments. For example, the correction to the skill for adapting the skill to the (new) environment can be represented as additional parameters defined by a perturbation to original formulation of the forcing function in the original DMP formulation. These additional parameters can be optimized using an optimization problem that can be solved using any known solver. The resulting formulation is the constrained DMP or CDMP which provides constrained control of the robot for executing a task within an environment.

FIG. 1A illustrates a block diagram of a system 100 including a controller 101 for controlling an operation of a robot 102 to execute a task, in accordance with an embodiment of the present disclosure.

The robot 102 may comprise such as a robotic arm or a robotic manipulator which is desired to execute the task. The task may include such as lifting of an object, moving of an object, placement of an object at a desired position, shifting of an object from one position to another position and the like. To this end, the robot 102 may need to follow a trajectory of motion in order to execute the desired task. For example, the robot 102 may be a food placement robot, which is configured to place different food items within specified positions in a box or delivery carton.

In another example, the robot 102 is an assembly line robot which is used to lift and move objects within an industrial or manufacturing unit, such as between different machines, for transporting objects, removing defected manufactured units, and the like.

Another example of the task is for an end effector of the robot 102 to move from an initial location in 3D space, to another location in 3D space; another example of the task is to open a gripper end effector, go to a location in 3D space, close the gripper to grasp an object, and move to a final location in 3D space.

In general, a task has a start condition and an end condition, referred to as the task goal. A task is considered complete once the task goal has been obtained. A task can be separated into subtasks. For example, if the task is for the robot 102 to move to a 3D location in Cartesian space, and then pick up an object, the task can be decomposed into subtasks: (1) move to a 3D location; and (2) pick up an object. It is understood that more complex tasks can be decomposed into subtasks by a program. If a task is decomposed into subtasks, a task description can be provided for each subtask. In one embodiment, a task description may be provided by a human operator. In another embodiment, a program is executed to obtain a task descriptions. A task description may also contain constraints for the robot 102. An example of such a constraint is that the robot 102 cannot move faster than some velocity specified by a human operator. Another example of a constraint is that the robot 102 is prohibited to enter part of the 3D Cartesian workspace, as specified by a human operator. The objective for the robot 102 is to complete the task specified in a task description as fast as possible, given any constraints in the task description.

The robot 102 may include one or more sensors that may be configured to obtain sensor data associated with one or more obstacles, or multiple objects present in the environment of the robot 102, or the movements performed by the robot 102 itself. For example, the one or more sensors may include vision sensors, i.e. cameras. In some embodiments, the robot 102 may be communicatively coupled to the one or more sensors via a communication network.

Further, the robot 102 is configured to receive one or more control inputs generated by the controller 101. The control inputs are configured to cause the robot 102 to perform the desired task. To that end, the control inputs may be received by one or more actuators of the robot 102, which further generate signals for controlling different parts of the robot, such as a robotic arm of the robot 102, to move the robot 102 along a desired trajectory of motion and thus perform the task. The robot 102 receives different control inputs for different tasks from the controller 101 configured to generate these different control inputs. The controller 101 controls the motion of the robot 102 to complete the task by sending commands to a physical robot system, such as the robot 102. In another embodiment the controller 101 is incorporated into the robot 102.

Figure 1B:
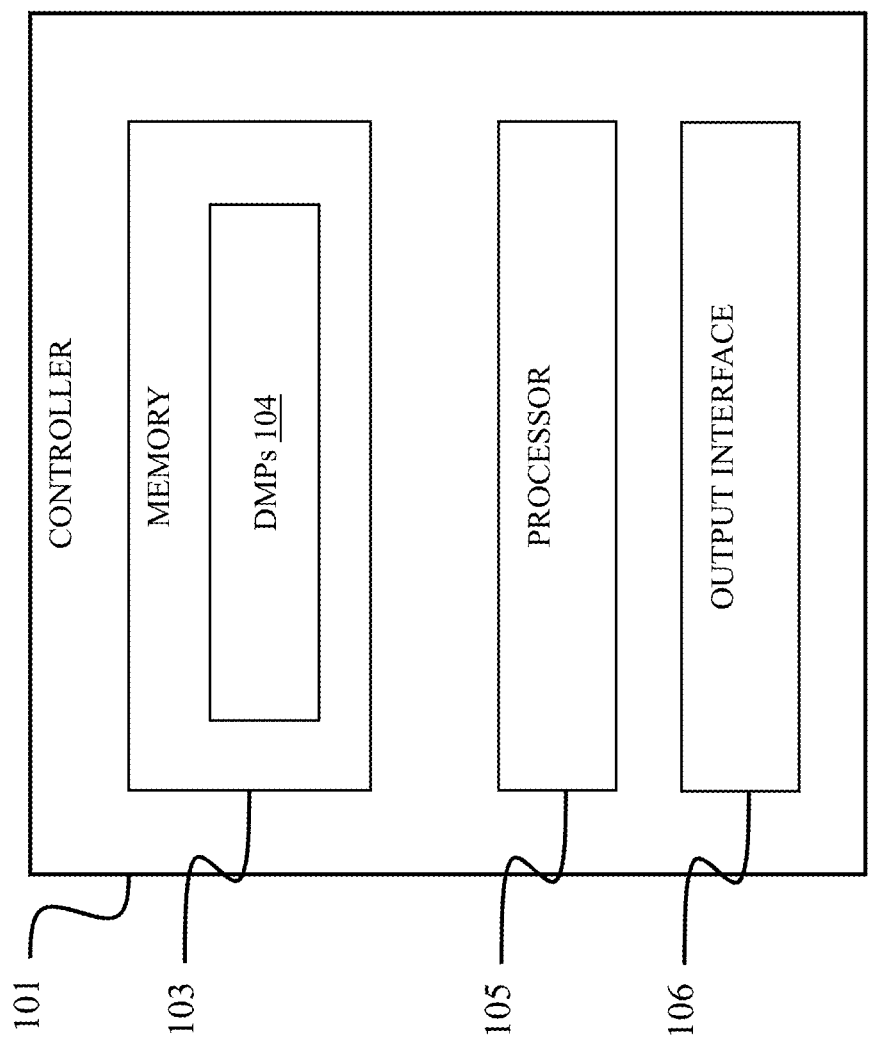
FIG. 1B illustrated a block diagram of the controller of FIG. 1A, in accordance with an embodiment of the present disclosure.

FIG. 1B illustrates a block diagram of the controller 101 for controlling the operation of the robot 102 to execute the task. The controller 101 comprises a memory 103, a processor 105, and an output interface 106. Additionally, the controller 101 may also comprise an input interface and other components that are needed for the controller 101 to perform the operations included in the description herein, without deviating from the scope of the present disclosure.

The memory 103 is configured to store computer-executable instructions that may be executed by the processor 105. The processor 105 can be a single core processor, a multi-core processor, a computing cluster, or any number of other configurations. The memory 103 can include random access memory (RAM), read only memory (ROM), flash memory, or any other suitable memory systems. The processor 105 is connected through a bus to one or more input and output devices.

The memory 103 is also configured to store a set of dynamic movement primitives (DMPs) 104 associated with the task. To that end, the memory 103 may be configured to store the DMPs 104 representative of an original task performed by the robot 102. For example, the original task may include motion of an end effector of the robot 102 along an original trajectory. These DMPs 104 may be obtained during a learning phase of the robot 102, when the robot 102 learns various parameters associated with the task, by means of a demonstration performed by a human operator. As will be appreciated by those skilled in the art, DMP-based techniques are widely used for learning skills that can be demonstrated to a robot by a skilled human or a controller. Thus, using the technique of learning from demonstration, characteristics of the original demonstration are learned by the robot 102. These characteristics include such as how the robot's end-effectors moved during the task demonstration.

DMPs 104 are a nonlinear dynamical system formulation that can learn complex tasks (such as trajectories) from demonstrations by decoupling a nonlinear forcing function from the nominal attraction behavior. In other words, DMPs 104 are a method of task control and planning. As such, the DMPs 104 are a proposed mathematical formalization of complex sub-tasks, such as movements in case of trajectories, composed of sets of primitive action 'building blocks' executed in sequence and/or in parallel. As will be further appreciated, the DMPs 104 differ from previously proposed building blocks as the DMPs 104 are a nonlinear dynamical system.

For example, in the case of trajectory planning, the DMPs 104 may be understood as a combination of two systems—an imaginary system to plan trajectories and a real system to execute the planned trajectories in reality. The DMPs 104 may include their own set of dynamics, and upon setting up the DMPs, a control signal can be obtained for the robot 102 to follow. This control signal is what forms the control input generated by the controller 101 for the robot 102 to execute the desired task. For example, a DMP control signal for a path (i.e. trajectory) for an end-effector of the robot 102 (also, called robotic manipulator) to follow may include a set of forces that need to be applied to the end-effector to conduct that path. The robot 102 may apply these forces by converting into joint torques.

For the task of trajectory planning, a trajectory may be represented in terms of a function $y_d(t)$, t in set [0, T]. The trajectory may include a plurality of via points of the end-effector in Cartesian space (pose and attitude). Once one or more trajectories y(t) are recorded for one fixed pose, a DMP learning algorithm may learn a DMP for each of the components of y(t). To remove explicit time dependency, the DMP 104 uses a canonical system to keep track of the progress of the task.

As such, the DMPs 104 are of the form of two coupled sets of parametrized ordinary differential equations (ODEs) representing the task. For example, the DMPs 104 can generate a trajectory that brings a system, such as the robot 102, from a start pose to a goal pose. The DMPs 104 can easily adapt the trajectory according to new starting as well as goal states, thus constituting essentially a closed-loop controller. Also, the DMPs 104 can be learned from a limited number of training examples, including even a single one. Hence, it is possible to modify the original trajectory in response to the change of the start pose and the goal pose. The formulation of the DMPs 104 will be further explained in FIG. 2A.

Figure 2A:
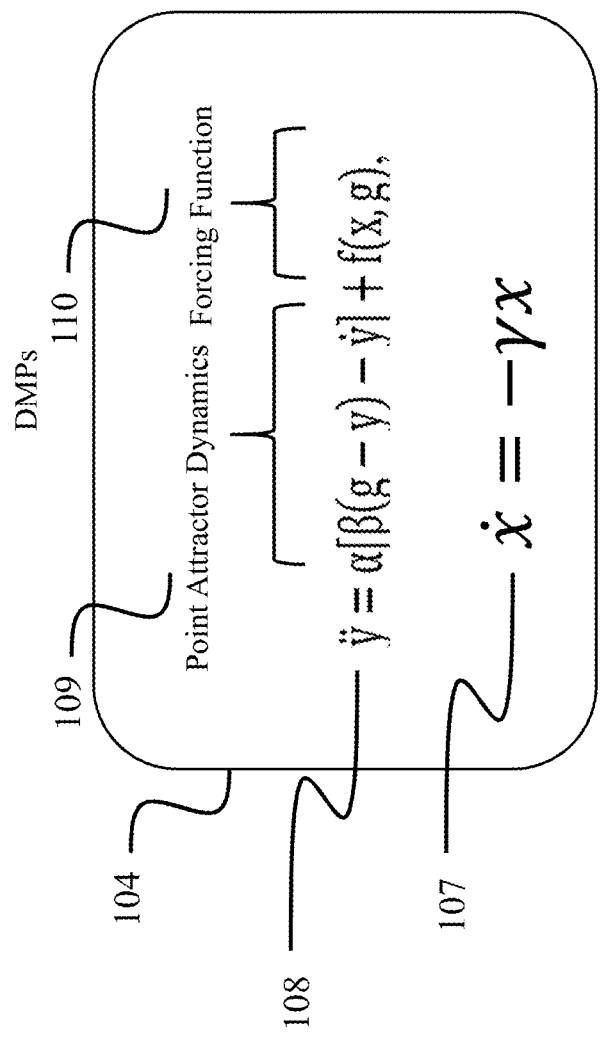
FIG. 2A illustrates a schematic showing a set of DMPs used by the controller of FIG. 1B, in accordance with an embodiment of the present disclosure.

FIG. 2A illustrates a schematic showing the set of DMPs 104 used by the controller 101 of FIG. 1B, in accordance with an embodiment of the present disclosure. The set of DMPs 104 comprise a set of at least two dynamical systems, a first dynamical system 107 and a second dynamical system 108. The second dynamical system 108 comprises a function representing point attractor dynamics 109 associated with the task and a forcing function 110 associated with a learned demonstration of the task.

For example, when the task is following a trajectory for motion of the robot 102 along a desired path, the two dynamical systems are represented as: the first dynamical system 107:

$$\dot{x} = -\gamma x, \qquad \text{(Eq. 1)}$$

Further, the second dynamical system 108 is illustrated in FIG. 2B.

FIG. 2B illustrates that the second dynamical system 108 is given by:

$$\ddot{y} = \alpha[\beta(g-y)-\dot{y}] + f(x,g) \qquad \text{(Eq. 2)}$$

where, y, $\dot{y}$, $\ddot{y}$ represent different demonstration trajectories used for learning a DMP, such as the DMP 104. The point attractor dynamics 109 are given as $\alpha[\beta(g-y)-\dot{y}]$. As may be understood by one of ordinary skill in art, that the point attractor dynamics 109 are representative of a set of states toward which the second dynamical system 108 tends to evolve, for a wide variety of starting conditions of the second dynamical system 108. System values that get close enough to the attractor values remain close even if slightly disturbed. To that end, function of the point attractor dynamics 109 comprises parameters associated with a start spatial pose of the robot 102 and a goal spatial pose of the robot 102.

For example, the set of DMPs 104 is associated with the point attractor dynamics 109 parameterized by a start spatial pose and a goal spatial pose of the robot 102, and the forcing function 110 comprising one or more weights corresponding to basis functions associated with an original trajectory of the robot 102. The original trajectory may be configured with a plurality of original spatial points between the start spatial pose and the end spatial pose. It should be noted that the one or more predefined weights may be configured in a first configuration, in response to one or more demonstrations.

Further, the forcing function 110 is represented by the term f(x, which is illustrated in FIG. 2C.

FIG. 2C illustrates that the forcing function 110 can be represented as:

$$f(x,g) = \frac{\sum_{i=1}^{N}\Psi_i w_i}{\sum_{i=1}^{N}\Psi_i} x(g - y_0) \quad \text{(Eq. 3)}$$

The forcing function 110 comprises one or more weights 111, $w_i$, corresponding to a set of basis functions 112, $\Psi_i$, associated with the task, such that the one or more weights 111 are adjustable parameters associated with the learned demonstration of the task.

The forcing function 110 therefore includes adjustable parameters $w_i$. The weights 111 of the weighted combination are learned based on the demonstration of the task. Further, the one or more weights 111 are learned by solving a locally weighted regression to learn the one or more weights 111 for the basis functions 112. In the example of trajectory generation task for the robot 102, the forcing function 110, f(x,y) is learned from a demonstration trajectory for the task. By learning f(x,y) from the demonstrations, the characteristics of the original demonstration (e.g. how the robot end-effector moved during a task) are learnt. These are learnt, for example, by solving a locally weighted regression to learn the weights for the basis functions 112, during the learning phase.

In particular, the forcing function 110 may include a weighted combination of the basis function 112. For example, the basis function 112 can be a radial basis function as illustrated in FIG. 2D.

Figure 2D:
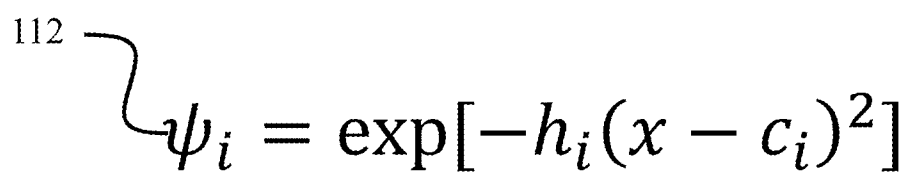

FIG. 2D illustrates a mathematical formulation corresponding to the basis function 112 represented by the set of DMPs 104. The basis function 112 is given as:

$$\Psi_i(s) = \exp(-h_i(x-c_i)^2) \quad \text{(Eq. 4)}$$

where $h_i$ and $c_i$ denote the width and center of the Gaussian basis functions, respectively. When the DMPs 104 are related to the task of trajectory generation, the basis functions 112 cover an entire duration of the trajectory. Additionally, the parameters $w_i$ of the forcing function 110 can be obtained through least-squares regression from the trajectory y(t). By applying the DMP learning algorithm, one or a set of DMPs can be determined. The DMPs can generate a new desired trajectory yew(t), for given a new goal pose gd, by integrating the DMP's ordinary differential equations (ODE) forward in time from the starting position and without any additional demonstrations or programming. As such, the DMPs use point attractor dynamics parameterized by their start and goal positions and modified by a force term that includes a forcing function learned by demonstration. Here, the forcing function represents the skills demonstrated by the operator. The transformation of the skills into the actual trajectory connecting the start poses and the end poses of the point actuator may be determined by solving and integrating ordinary differential equations for specific start and the end poses.

Referring back to FIG. 1B, the controller 101 further comprises the processor 105, which configured to execute one or more computer executable instructions. The one or more computer executable instructions cause the processor 105 to execute one or more operations. To that end, due to the execution of the one or more operations, the processor 105 is configured to transform, the set of DMPs 104 to a set of constrained DMPs (CDMPs).

The present disclosure provides for a constrained DMP (CDMP) which includes an additional function representing the perturbation to original forcing function 110, so that the learned DMP 104 can satisfy novel operational constraints. It should be noted that the operational constraints may depend on the environment that the robot 102 is performing the task in. As such, the different environments can have different constraints, and therefore the function may solely depend on the constraints that need to be satisfied, which is done during operation of the robot 102 in the new environment.

FIG. 3A illustrates a block diagram showing a transformation 113 of the set of DMPs 104 to a set of constrained DMPs (CDMPs) 114, according to an embodiment of the present disclosure.

The transformation 113 is performed by defining a perturbation to the originally learned forcing function 110, such that the perturbation is associated with a set of operational constraints 115 which are related to the task to be performed by the robot 102. The set of operational constraints 115 may be defined by the environment in which the robot 102 is operating. More specifically, the perturbation defines an additional set of parameters representing the operational constraints 115 in the learned forcing function 110. The additional set of parameters being representative of novel task constraints. To that end, successful execution of the task is determined on the satisfaction of constraints included in the set of operational constraints 115.

For example, the set of operational constraints 115 may include a collision avoidance constraint. The collision avoidance constraint may include conditions for ensuring that the robot 102 should not collide with an obstacle that may be present in the environment of the robot 102.

In another example, the set of operational constraints may include a self-collision avoidance constraint. The self-collision avoidance constraint may include conditions for ensuring that the robot 102 does not collide with itself.

In yet another example, the set of operational constraints 115 may include a constraint on a joint limit of an end effector of the robot 102. Consider for example, a task where the learned DMP is reparametrized in the new environment based on a new goal and start state. However, it might be possible that a new trajectory for this task is not feasible to run on the robot 102 since some of the joint rotations may not be kinematically feasible. It is possible that such a constraint might be explicitly considered in the formulation for CDMPs 114 and thus a feasible solution satisfying the joint limits could be found.

The set of operational constraints 115 are introduced in the form of addition of a perturbation term to the learning forcing function 110. As a result of the transformation 113, the original set of DMPs 104 are transformed into the set of CDMPs, as illustrated in FIG. 3B.

Figure 3B:
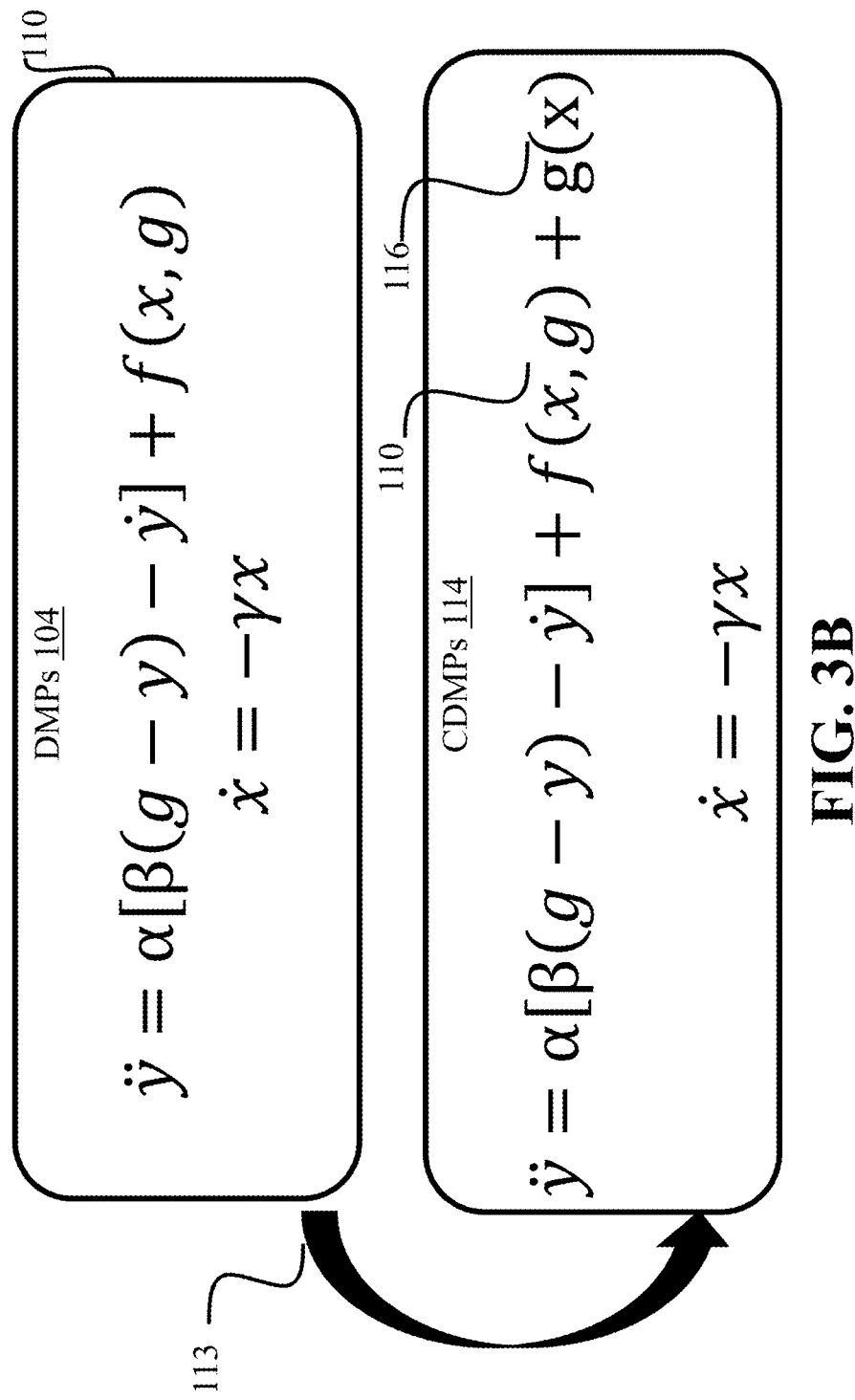
FIG. 3B illustrates a block diagram showing transformation of the set of DMPs to a set of constrained DMPs (CDMPs) using a perturbation function, in accordance with an embodiment of the present disclosure.

FIG. 3B illustrates a block diagram showing the transformation 113 of the set of DMPs 104 to the set of constrained DMPs (CDMPs) 114 using a perturbation function 116, g(x), in accordance with an embodiment of the present disclosure. As illustrated in FIG. 3B, the perturbation function 116 is added as additional set of parameters representing the set of operational constraints 115 in the learned forcing function 110 to define the perturbation function 116. As a result of the addition of the perturbation function 116, the transformed DMP or the CDMP 114 is represented as:

$$\ddot{y}=\alpha[\beta(g-y)-\dot{y}]+f(x,g)+g(x) \quad \text{Eq. (5)}$$

$$\dot{x}=-\gamma x \quad \text{Eq. (6)}$$

where, in Eq. (5) g(x) represents the perturbation 116 to the learned forcing function 110.

Further, the perturbation function 116 comprises novel task constraints represented by the additional set of parameters as barrier functions which are at least once differentiable, which is illustrated in FIG. 3C.

FIG. 3C illustrates a mathematical representation showing a barrier function 117, $\zeta_i$ usage in the perturbation function 116, in accordance with an embodiment of the present disclosure. To identify a value of the barrier function 117, the set of operational constraints 115 are used to formulate a non-linear optimization problem for the set of CDMPs 114. The forcing function 110 with additional set of parameters in the perturbation 116 term is thus represented as:

$$f(x, g) + g(x) = \frac{\sum_{i=1}^{N} \Psi_i(w_i - \zeta_i)}{\sum_{i=1}^{N} \Psi_i} x(g - y_0) \quad \text{(Eq. 7)}$$

Figure 3D:
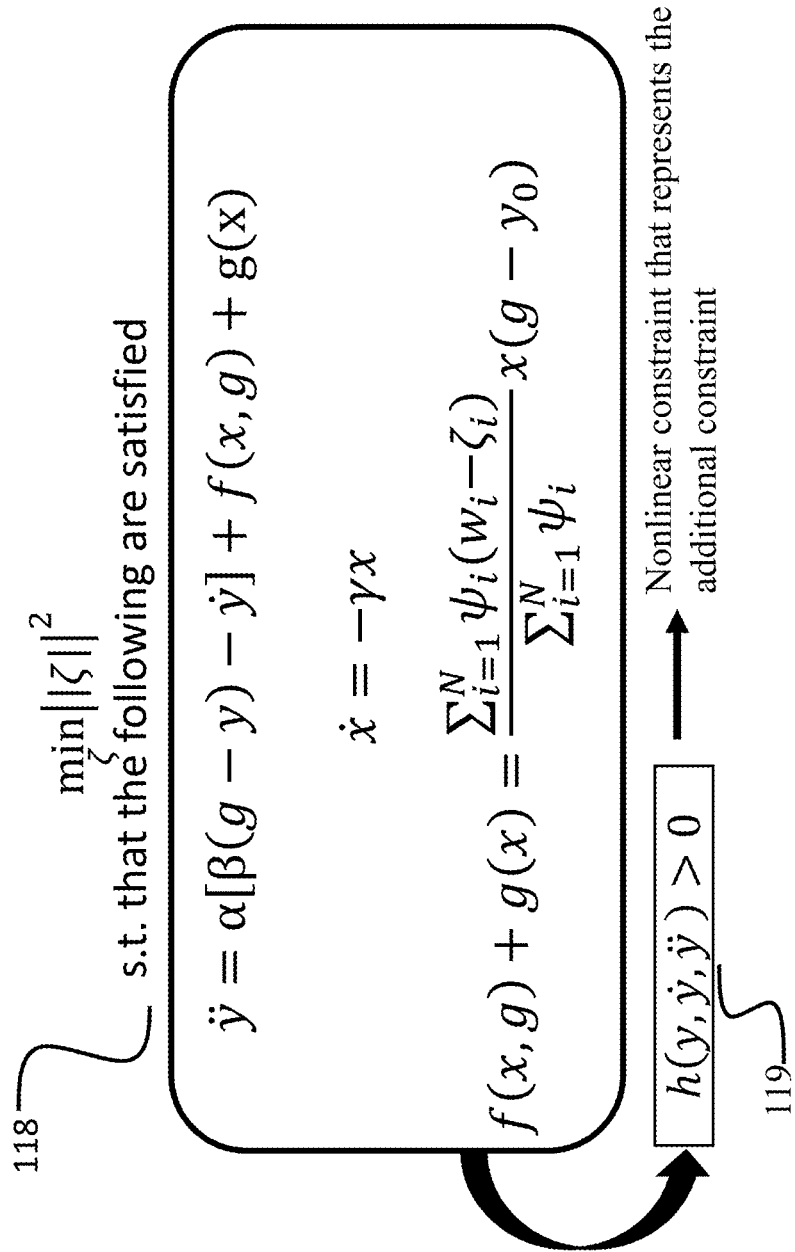
FIG. 3D illustrates a mathematical formulation for a non-linear optimization problem which is solved to determine the value of barrier function, in accordance with an embodiment of the present disclosure.

Where, the barrier function 117, $\zeta_i$ represents the additional set of parameters to be found via optimization. In other words, in the Eq. 7, the corrected forcing function is represented by:

$$\frac{\sum_{i=1}^{N} \Psi_i(w_i - \zeta_i)}{\sum_{i=1}^{N} \Psi_i}$$

where, $\zeta_i$ represents the correction, which can be determined by solving a non-linear optimization problem, as illustrated in FIG. 3D.

FIG. 3D illustrates a mathematical formulation for a non-linear optimization problem 118 which is solved to determine the value of barrier function 117, $\zeta_i$.

The non-linear optimization problem 118 comprises:

$$\min\|\zeta\|^2 \text{ such that } y = \alpha[\beta(g-y)-\dot{y}] + f(x,g) + g(x)$$

$$\dot{x} = -\gamma x$$

$$f(x, g) + g(x) = \frac{\sum_{i=1}^{N} \Psi_i(w_i - \zeta_i)}{\sum_{i=1}^{N} \Psi_i} x(g - y_0)$$

The solution of the non-linear optimization problem 118 for the set of CDMPs based on the set of operational constraints 115 is then used to identify a feasible set of values for the additional set of parameters of a novel task to be executed by the robot 102, and with the barrier function 117 now representing the novel task constraints. The feasible set of values correspond to those values of the additional set of parameters which satisfy constraints associated with the task to be performed, such as the novel task constraints mentioned here, under the given set of environmental conditions. Thus the feasible set of values includes the set of all possible points of non-linear the optimization problem 118 that satisfy the problem's constraints, potentially including inequalities, equalities, and integer constraints. Further, the solution to the non-linear optimization problem 118 is used to determine the perturbation function 116, which is then further used to generate, one or more control inputs for controlling the robot 102 for executing the task, based on the solution of the non-linear optimization problem 118 for the set of CDMPs 114.

However, in the non-linear optimization problem 118, earlier there was no constraint on $\zeta$. Therefore, another condition is needed on to help determine the value or solution of $\zeta$ by introducing the novel task constraints. Thus, an additional constraint 119 term, h(y, ẏ, ÿ)>0 is added, which is a mathematical representation of the novel task constraint.

In an example, the additional constraint 119 specifies a limit on the amount of the deviation of the CDMP 114 from the original DMP 104. The design of CDMP 114 could be seen as a trade-off between constraint satisfaction and the original forcing function 110. This trade-off could be controlled using a hyperparameter which constrains the maximum allowable deviation between the original DMP 104 and CDMP 114, which can be added as the additional constraint 119 to the non-linear optimization problem 118.

The solution of the non-linear optimization problem 118 may be obtained using any known off-the-shelf solvers such as IPOPT™, SNOPT and the like. Thus, the transformation of the DMPs 104 to the CDMPs 114 disclosed herein provides a very cost-effective, computationally efficient, easy-to-implement, and practical solution to the problem of motion control of robots, in constrained environments. Also, the CDMPs 114 are based on satisfaction of operational constraints 115 which include safety and collision avoidance conditions, making the overall operation of the robot 102 very safe and efficient.

Further, the solution of the optimization problem 118 leads to determination of corrected weights for the modified forcing function 110, which is transformed into control inputs, which are transmitted by the output interface 106 to the robot 102, in order to command the robot 102 to execute the generated control input to execute the task.

Figure 4A:
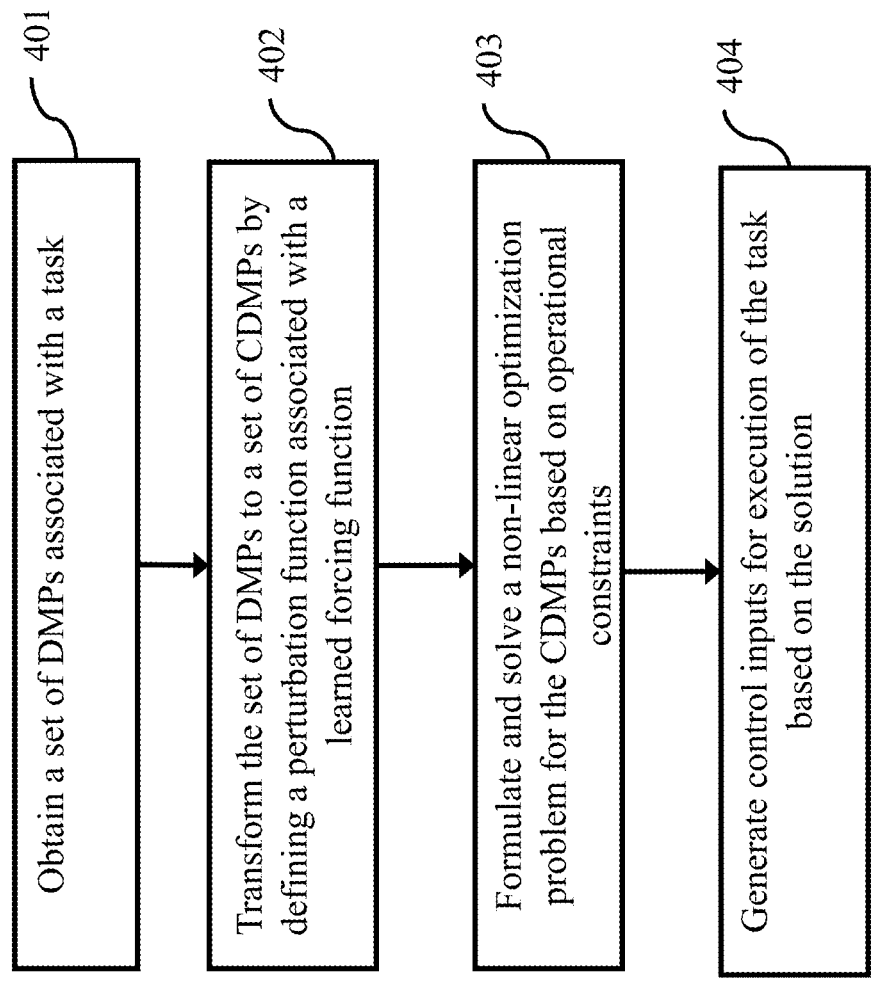
FIG. 4A illustrates a flow diagram of a method executed by a controller for executing a task by a robot, in accordance with an embodiment of the present disclosure.

FIG. 4A illustrates a flow diagram of a method executed by the controller 101 for execution of the task by the robot 102, in accordance with an embodiment of the present disclosure.

At 401, a set of DMPs associated with the task is obtained. For example, the set of DMPs 104 stored in the memory 103 are acquired by the processor 105.

Then, at 402, the set of DMPs are transformed to a set of CDMPs by defining a perturbation to an originally learned forcing function associated with the task. For example, the DMPs 104 include the originally learned forcing function 110, f(x,g), which is transformed 113 by defining the perturbation function 116, g(x), which is added as an additional parameter to the learned forcing function 110, f(x,g). The perturbation function 116, g(x), is associated with the operational constraints 115 that need to be satisfied for performance of the task.

Figure 4B:
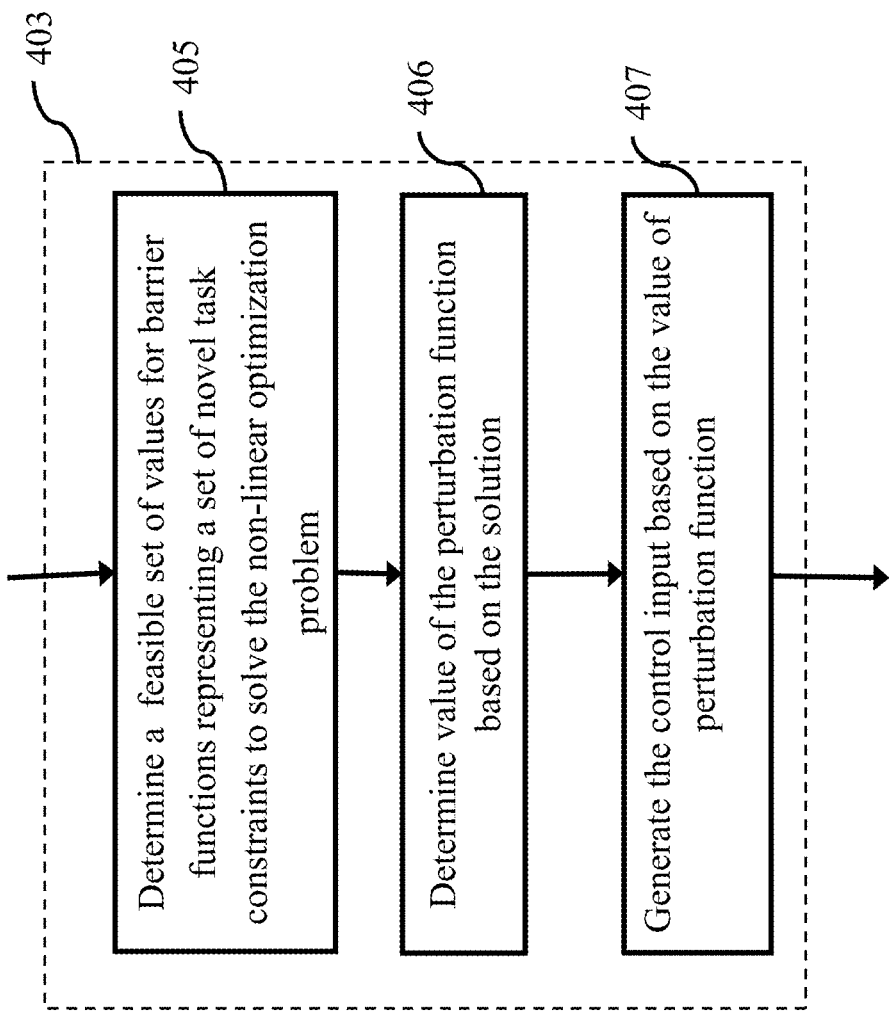
FIG. 4B illustrates a flow diagram of another method executed by a controller for executing a task by a robot, in accordance with an embodiment of the present disclosure.

In order to determine the value of the perturbation function 116, at 403, a non-linear optimization problem 118 is formulated and solved by the processor 105, by using the formulations for the set of the CDMPs 114 and the operational constraints 115, which include a set of novel task constraints defined by a change in the environment of the robot performing the task. These novel task constraints are represented as an additional set of parameters in the perturbation function 116. To that end, FIG. 4B illustrates a flow diagram of another method executed by the controller 101 for determining the solution of the non-linear optimization problem 118. At 405, a feasible set of values for the barrier function 117 representing the novel task constraints for the operational constraints 115 is determined. This is discussed in conjunction with FIG. 3D.

The value of the barrier function 117 in turn is used to determine the value of the perturbation function 116, at 406, such as by using the modified forcing function provided in Eq. 7.

Further, at 407, the solution of the value of the perturbation function 116 is used to generate control inputs for by the controller 101, for controlling the robot 102. The methods illustrated in FIGS. 4A and 4B are explained using the exemplar task of trajectory generation, as provided below.

In the example, the original trajectory may be based on obtaining a plurality of movements performed by an end-effector associated with the robot 102, in response to the demonstration, using a sensor. For example, the sensor may be an encoder and/or a vision sensor. These movements are used to generate the DMPs 104 corresponding to the movements performed by the end-effector associated with the robot 102. These DMPs are then stored in the memory 103 of the controller 101 and obtained, at step 401 described above.

As will be appreciated, the DMPs 104 may lead to undesirable behavior in the presence of the operational constraints 115 that are different from the constraints during the demonstration. As the DMPs 104 does not explicitly consider any additional disturbances and simply learn the forcing function during the demonstration, the resulting generalization may only be admissible only during the demonstration. However, in absence of any adaptation of the forcing function during actual operation, the resulting robot trajectory might be infeasible during the actual control. For example, a change of the environment can lead the robot 102 to a collision due to a novel task constraint on the admissible state of the robot, which is absent during the manipulation, thereby placing the object being manipulated by the robot 102 outside its reach defined by physical constraints on the structure of the robot.

The operational constraints 115 may include additional or different obstacles present in the environment of the robot 102, as compared with the previous environment. To this end, the operational constraints 115 may include a location and a configuration associated with the obstacles present in the environment of the robot 102, in the changed environment. For example, the location and the configuration may be obtained using a vision sensor using pose estimation techniques. Alternately or additionally, the robot 102 may have a joint limitation of an end-effector of the robot.

Thus, these additional constraints may form novel task constraints that may be used at the step 402 for defining the perturbation 116 to the original forcing function 110, which in turn leads to reconfiguring of the one or more predefined weights 111 associated with the original trajectory of the original forcing function 110, in a second configuration, based on the one or more operational constraints 115. In some embodiments, reconfiguring the one or more predefined weights 111 may include converting the one or more operational constraints 115 into one or more differentiable functions using a Smooth function or the barrier function 117. For example, the Smooth function may be a Control Barrier Function (CBF).

In an example, the barrier function 117 is a zeroing barrier function (ZBF). One of the advantages of using ZBFs for representing constraints is the generality they offer—the ZBFs can certify joint limit avoidance as well as obstacle avoidance. Further, the above formulation results in a non-linear optimization to perturb the DMP forcing weights regressed by locally-weighted regression to admit a user-constructed ZBF, which can be solved using standard NLP solvers. The CDMP under different constraints on the end-effector movement like collision avoidance and state constraints for safety. The ZBFs are used to represent smooth, task-specific constraints. An additional set of parameters is added to the resulting formulation which can be optimized to satisfy these constraints. The resulting optimization is cast as a nonlinear program, which can be solved using off-the-shelf non-linear program solvers like IPOPT. Using the set invariance property of ZBFs, constraint satisfaction for the CDMPs is guaranteed. The ZBFs may then be used to optimize the one or more weights.

More explicitly, we provide a brief mathematical overview of ZBFs and how they can used for incorporating the novel task constraints in novel environments. First, let us assume that h(s): $R^n \to R$ be a continuous differentiable function. Define set C to be the following super-level set:

$$C = \{s \in R^n : h(s) \geq 0\}$$

$$\partial C = \{s \in R^n : h(s) = 0\}$$

$$\text{Int}(C) = \{s \in R^n : h(s) > 0\}$$

Assuming a nonlinear dynamical system of the form:

$$\dot{s} = f(s) \tag{Eq. 8}$$

The h(s) is ZBF if the following inequality holds:

$$\dot{h}(s) \geq -\gamma h(s)$$

where $\gamma : R \to R$ is a class-K function, and we consider the case when $\gamma > 0$.

For the dynamical system above (Eq. 8) if a valid ZBF h(s) (or alternatively, change our dynamical system to admit an existing ZBF) is found, then the dynamical system [Eq. 8] is forward invariant in the set C, i.e. if $s_0 \in C$ and $\dot{s} = f(s)$ then:

$$s \in C, \forall t \in [0, \infty)$$

Since collision avoidance is one of the most common operational constraints for robots, we explain how we can obtain ZBFs for collision avoidance. Given an obstacle set $\Omega$ with boundary on in $\mathbb{R}^3$, usual definition of a signed distance function (SDFs) f: $\mathbb{R}^3 \to \mathbb{R}$ is used to define the boundary of the obstacle:

$$f(x) = \begin{cases} d(x, \partial\Omega), & \text{if } x \notin \Omega, \\ -d(x, \partial\Omega), & \text{if } x \in \Omega. \end{cases}$$

where, the distance (or metric) $d(x, \partial\Omega)$ is defined by:

$$d(x, \partial\Omega) = \inf_{y \in \partial\Omega} d(x, y)$$

$|\nabla f| = 1$, wherever this gradient is well-defined (and for convex polytopes, this is true whenever $f(x) > 0$). Further, the implicit surface embedded in $\mathbb{R}^3$ defined by the set of all points $x \in \mathbb{R}^3$ where $f(x) = 0$ is also the boundary of the obstacle, and $f(x) < 0$ whenever x is inside the obstacle. Thus, SDFs fulfill the requirements for a function to designate a safety set (what we denote as h(s) above) and certify that a DMP trajectory is also invariant in the safety set $\Omega^c$.

The exact SDFs of several primitive shapes (sphere, box, and cylinder) are computed. A smooth lower-bound SDF of the union of the two obstacles is computed to ensure differentiability of the SDF in the safety set. A centroid of each shape is assumed to be positioned at the origin of $\mathbb{R}^3$ for simplicity, since these SDFs can represent shapes in arbitrary poses by translation and rotation. Signed distance function for a large class of regular shaped obstacles could be easily constructed and thus, they can be used for obtaining the ZBFs for collision avoidance constraint.

The one or more predefined weights are optimized using these one or more differentiable functions. This is done by formulating and solving the non-linear optimization problem at step 403.

The CDMP takes an existing DMP with a forcing function learned from an expert trajectory, and then optimizes this forcing term so that the DMP dynamical system admits a ZBF that certifies that the DMP will produce trajectories that remain with the safety set of a workspace. This safety set (and ZBF) is constructed by composing signed-distance fields from primitive convex polytopes. More concretely, we describe the resulting nonlinear optimization problem as follows:

The system of equations and the forcing function for DMP could be written and expressed by the following system of equations:

$$\begin{bmatrix} \dot{x} \\ \dot{z} \\ \dot{y} \end{bmatrix} = \frac{1}{\tau} \begin{bmatrix} -\alpha_x x \\ (\alpha_z(\beta_z(g-y)-z) + f(x)) \\ z \end{bmatrix} \quad \text{(Eq. 9)}$$

Where, $$f(x) = \frac{\sum_{i=1}^{N} w_i \Psi_i(x)}{\sum_{i=1}^{N} \Psi_i(x)}$$

is the forcing function expressed as sum of radial basis functions and which are learned from the provided expert demonstration.

The CDMP 114 introduces additional parameters in the original DMP 104 formulation which can be optimized to allow constraint satisfaction. The CDMPs 114 are computed by optimizing a set of perturbations $\{\zeta_i\}$ of the original (regressed) weights $\{w_i\}$ of the original forcing function 110 to obey the ZBF inequality for forward-invariance in the user-defined safety set.

$$\tilde{f}(x) = \frac{\sum_{i=1}^{N} (w_i - \zeta_i)\Psi_i(x)}{\sum_{i=1}^{N} \Psi_i(x)} \quad \text{(Eq. 10)}$$

Where $\zeta_i$ are the decision variables optimized for the formulated optimization problem. We note that this is only one possible way to express perturbations of the original DMP 104 forcing function 110 based on its most common representation as a radial-basis function in the DMP literature.

The formulation of the nonlinear optimization problem 118 is used to compute $\{\zeta_i\}$. The set of parameters $\{\zeta_i\}$ is represented by p), as:

$$\min_{s,p} \int_{t_0}^{t_f} c(s(t), p)dt + \phi(s(t_f), p) \quad \text{(Eq. 11)}$$

subject to the dynamic constraints:

$$\tau \begin{bmatrix} \dot{x} \\ \dot{z} \\ \dot{y} \end{bmatrix} + \begin{bmatrix} \alpha_x x \\ -(\alpha_z(\beta_z(g-y)-z) + \tilde{f}(x)) \\ -z \end{bmatrix} = 0 \quad \text{(Eq. 12)}$$

$$\dot{h}(s) + \gamma h(s) \geq 0 \quad \text{(Eq. 13)}$$

$$s(t_0) = s_0 \quad \text{(Eq. 14)}$$

where $s=[x, z, y]^T$ and p is the set of parameters (including the $\zeta_i$). Note that the function $c(\cdot, \cdot, \cdot)$ represents the cost functional for the optimization problem. The simplest cost function can penalize the L2-norm of the decision variables $\zeta_i$.

The problem formulation represented by [Equations 11-14] is converted to a finite dimensional discretized problem. This can be then solved to yield the set of desired parameters using a nonlinear optimization solver like IPOPT or SNOPT.

Further, a new trajectory is generated based on the one or more predefined weights configured in the second configuration. The new trajectory may include a plurality of new spatial points between the start spatial point and the end spatial point. It should be further noted that at least one of the plurality of new spatial points may be different from the plurality of original spatial points.

In some embodiments, generating the new trajectory may include formulating the non-linear dynamic constrained optimization problem 118 using the one or more predefined weights associated with the original trajectory and the one or more differentiable functions 117 corresponding to the one or more operational constraints 115. Further, generating the new trajectory may include solving the non-linear dynamic constrained optimization problem 118 by optimizing the one or more predefined weights for a radial basis function, such as the basis function 112, to generate the new trajectory. The new trajectory satisfies the one or more operational constraints 115 for performing the task. To that end, determining the new trajectory comprises determining correction terms 116 modifying at least some of the weights 111 of the forcing function 110 such that the DMPs 104 having the forcing function with corrected weights represents a new feasible trajectory satisfying the operational constraints 115. In some embodiments, the one or more predefined weights may be optimized using a gradient-based solver, wherein the gradient-based solver is based on an interior point method, for example, Interior Point OPTimizer (IPOPT), Sparse Nonlinear OPTimizer (SNOPT), etc.

In some embodiments, in order to generate the new trajectory a hyperparameter corresponding to a deviation of the new trajectory from the original trajectory may be specified. Further, an extent of the deviation of the new trajectory from the original trajectory may be limited, based on the hyperparameter.

To that end, the following mathematical formulation may be used for the underlying optimization. The design of the CDMP 114 could be seen as a trade-off between constraint satisfaction and the original forcing function 110. This trade-off could be controlled using a hyperparameter which constrains the maximum allowable deviation between the original DMP 104 and the CDMP 114, which can be added as another constraint to the trajectory optimization problem. The original DMP trajectory may be denoted as $\{\tilde{y}(t)\}$, $t \in [t_0, t_f]$ and the hyperparameter for the deviation from the original trajectory as $\epsilon$. Then the additional constraint could be represented as follows:

$$\|y(t)-\tilde{y}(t)\|_2 \leq \epsilon \quad \text{(Eq. 15)}$$

With this additional deviation constraint, the optimization problem 118 can then be written as follows:

$$\min_{s,p} \int_{t_0}^{t_f} c(s(t), p)dt + \phi(s(t_f), p) \quad \text{(Eq. 16)}$$

such that, for Equations 15-17, $$\|y(t)-\tilde{y}(t)\|_2 \in \quad \text{(Eq. 17)}$$

Depending on the value of $\epsilon$, a family of CDMPs can be obtained that allows different amount of deviation of the new trajectory from the original DMP trajectory.

In this manner, the controller 101 may be used to perform motion control of the robot 102 for performing various tasks, such as the task of trajectory generation and optimization in presence of novel constraints, as described above. As will be understood by one of ordinary skill in the art that the example of trajectory generation described herein is only for example purpose. Any equivalent example may be used to implement the principles of various embodiments disclosed herein, without deviating from the scope of the present disclosure.

The controller 101 may be embodied to be within the robot 102. The controller 101 may be any general purpose or special purpose computer system known in the art. One example of such a computer system is described in FIG. 5.

Figure 5:
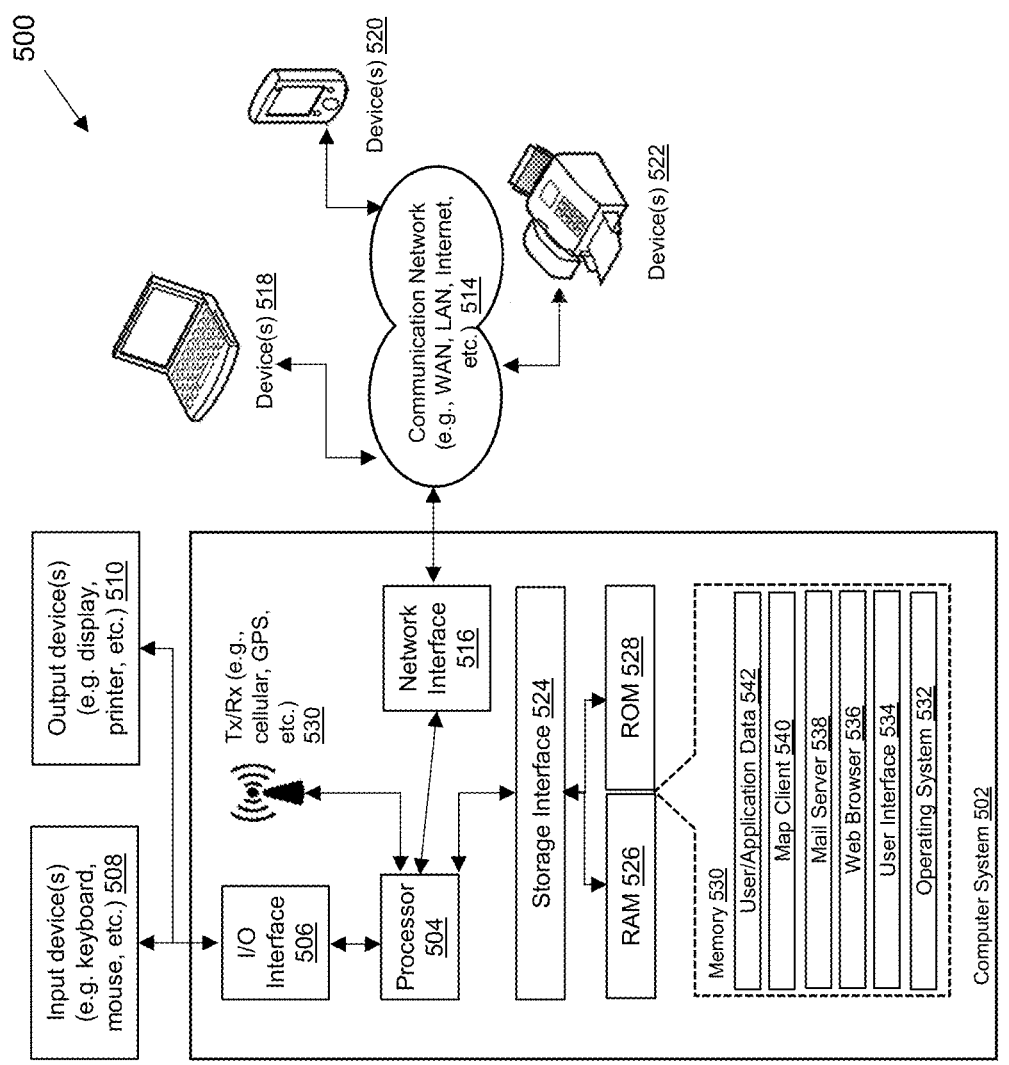
FIG. 5 is a block diagram of an exemplar computer system for implementing various embodiments.

FIG. 5 is a block diagram 500 of an exemplar computer system for implementing various embodiments. The disclosed methods and systems may be implemented on a conventional or a general-purpose computer system, such as a personal computer (PC) or server computer. Referring now to FIG. 5, the block diagram 500 of an exemplar computer system 502 for implementing various embodiments is illustrated. The computer system 502 may be used to implement the controller 101. The computer system 502 may be the controller alternatively. Computer system 502 may include a central processing unit ("CPU" or "processor") 504. Processor 504 may include at least one data processor for executing program components for executing user-generated or system-generated requests. The processor 504 may be equivalent to the processor 105 shown in FIG. 1B. A user may include a person, a person using a device such as those included in this disclosure, or such a device itself. Processor 504 may include specialized processing units such as integrated system (bus) controllers, memory management control units, floating point units, graphics processing units, digital signal processing units, etc. Processor 504 may include a microprocessor, such as AMD® ATHLON® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. Processor 504 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 504 may be disposed in communication with one or more input/output (I/O) devices via an I/O interface 506. I/O interface 506 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n /b/g/n/x, Bluetooth, cellular (for example, code-division multiple access (CDMA), high-speed packet access (HSPA+), global system for mobile communications (GSM), long-term evolution (LTE), WiMax, or the like), etc.

Using I/O interface 506, computer system 502 may communicate with one or more I/O devices. For example, an input device 508 may be an antenna, keyboard, mouse, joystick, (infrared) remote control, camera, card reader, fax machine, dongle, biometric reader, microphone, touch screen, touchpad, trackball, sensor (for example, accelerometer, light sensor, GPS, gyroscope, proximity sensor, or the like), stylus, scanner, storage device, transceiver, video device/source, visors, etc. An output device 510 may be a printer, fax machine, video display (for example, cathode ray tube (CRT), liquid crystal display (LCD), light-emitting diode (LED), plasma, or the like), audio speaker, etc. In some embodiments, a transceiver 512 may be disposed in connection with processor 504. Transceiver 512 may facilitate various types of wireless transmission or reception. For example, transceiver 512 may include an antenna operatively connected to a transceiver chip (for example, TEXAS® INSTRUMENTS WILINK WL1286® transceiver, BROADCOM® BCM4550IUB8® transceiver, INFINEON TECHNOLOGIES® X-GOLD 618-PMB9800® transceiver, or the like), providing IEEE 802.6a/b/g/n, Bluetooth, FM, global positioning system (GPS), 2G/3G HSDPA/HSUPA communications, etc.

In some embodiments, processor 504 may be disposed in communication with a communication network 514 via a network interface 516. Network interface 516 may communicate with communication network 514. Network interface 516 may employ connection protocols including, without limitation, direct connect, Ethernet (for example, twisted pair 50/500/5000 Base T), transmission control protocol/internet protocol (TCP/IP), token ring, IEEE 802.11a/b/g/n/x, etc. Communication network 514 may include, without limitation, a direct interconnection, local area network (LAN), wide area network (WAN), wireless network (for example, using Wireless Application Protocol), the Internet, etc. Using network interface 516 and communication network 514, computer system 502 may communicate with devices 518, 520, and 522. These devices 518, 520, and 522 may include, without limitation, personal computer(s), server(s), fax machines, printers, scanners, various mobile devices such as cellular telephones, smartphones (for example, APPLE® IPHONE® smartphone, BLACKBERRY® smartphone, ANDROID® based phones, etc.), tablet computers, eBook readers (AMAZON® KINDLE® e-reader, NOOK® tablet computer, etc.), laptop computers, notebooks, gaming consoles (MICROSOFT®) (BOX® gaming console, NINTENDO® DS® gaming console, SONY® PLAYSTATION® gaming console, etc.), or the like. In some embodiments, computer system 502 may itself embody one or more of these devices 518, 520, and 522.

In some embodiments, processor 504 may be disposed in communication with one or more memory devices 530 (for example, RAM 526, ROM 528, etc.) via a storage interface 524. Storage interface 524 may connect to memory 530 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 530 may store a collection of program or data repository components, including, without limitation, an operating system 532, user interface application 534, web browser 536, mail server 538, mail client 540, user/application data 542 (for example, any data variables or data records discussed in this disclosure), etc. Memory 530 may be equivalent to the memory 103. Operating system 532 may facilitate resource management and operation of computer system 502. Examples of operating systems 532 include, without limitation, APPLE® MACINTOSH® OS X platform, UNIX platform, Unix-like system distributions (for example, Berkeley Software Distribution (BSD), FreeBSD, NetBSD, OpenBSD, etc.), LINUX distributions (for example, RED HAT®, UBUNTU®, KUBUNTU®, etc.), IBM® OS/2 platform, MICROSOFT® WINDOWS® platform (XP, Vista/7/8, etc.), APPLE® MS® platform, GOOGLE® ANDROID® platform, BLACKBERRY® OS platform, or the like. User interface 534 may facilitate display, execution, interaction, manipulation, or operation of program components through textual or graphical facilities. For example, user interfaces 534 may provide computer interaction interface elements on a display system operatively connected to computer system 502, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (for example, AERO® platform, METRO® platform, etc.), UNIX X-WINDOWS, web interface libraries (for example, ACTIVEX® platform, JAVA® programming language, JAVASCRIPT® programming language, AJAX® programming language, HTML, ADOBE® FLASH® platform, etc.), or the like.

In some embodiments, computer system 502 may implement a web browser 536 stored program component. Web browser 536 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APis), etc. In some embodiments, computer system 502 may implement a mail server 538 stored program component. Mail server 538 may be an Internet mail server such as MICROSOFT® EXCHANGE® mail server, or the like. Mail server 538 may utilize facilities such as ASP, ActiveX, ANSI C++/C#, MICROSOFT .NET® programming language, CGI scripts, JAVA® programming language, JAVASCRIPT® programming language, PERL® programming language, PHP® programming language, PYTHON® programming language, WebObjects, etc. Mail server 538 may utilize communication protocols such as internet message access protocol (IMAP), messaging application programming interface (MAPI), Microsoft Exchange, post office protocol (POP), simple mail transfer protocol (SMTP), or the like. In some embodiments, computer system 502 may implement a mail client 540 stored program component. Mail client 540 may be a mail viewing application, such as APPLE MAIL® mail client, MICROSOFT ENTOURAGE® mail client, MICROSOFT OUTLOOK® mail client, MOZILLA THUNDERBIRD® mail client, etc.

In some embodiments, computer system 502 may store user/application data 542, such as the data, variables, records, etc. as described in this disclosure. Such data repositories may be implemented as fault-tolerant, relational, scalable, secure data repositories such as ORACLE® data repository OR SYBASE® data repository. Alternatively, such data repositories may be implemented using standardized data structures, such as an array, hash, linked list, struct, structured text file (for example, XML), table, or as object-oriented data repositories (for example, using OBJECTSTORE® object data repository, POET® object data repository, ZOPE® object data repository, etc.). Such data repositories may be consolidated or distributed, sometimes among the various computer systems discussed above in this disclosure. It is to be understood that the structure and operation of the any computer or data repository component may be combined, consolidated, or distributed in any working combination.

One working combination of such a system may include combination of the computer system 502 operating as the controller 101 for controlling the robot 102 to perform a task based on a prior-demonstration of the task performed by a human operator.

Figure 6A:
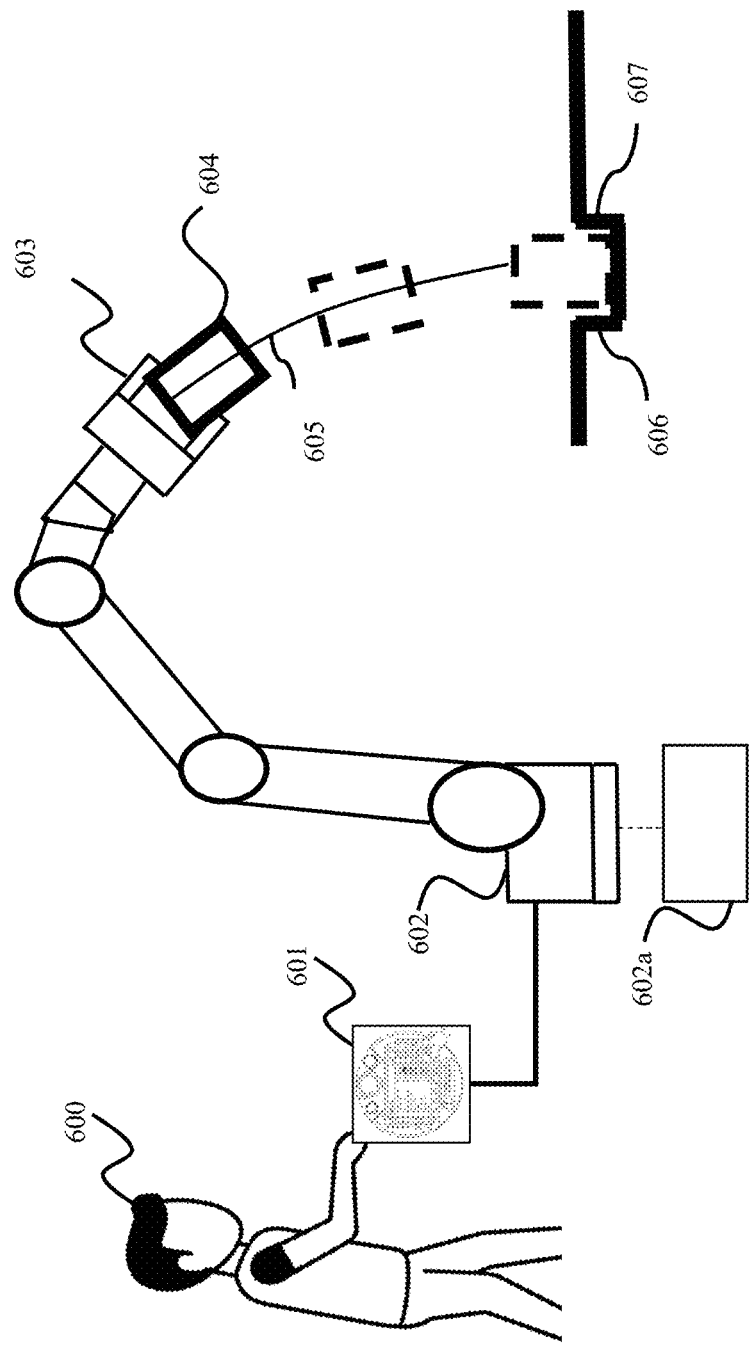
FIG. 6A illustrates a schematic of a use case of a robot system based on the controller of FIG. 1A in a first set of conditions, in accordance with an embodiment of the present disclosure.

FIG. 6A illustrates a schematic of a use case of a robot 602 in a process of learning from demonstration, according to an embodiment of the present disclosure.

A human operator 600 performs a demonstration of the task, such as a task of the robot 602 holding a moving object 604 in its gripper 603, moving along a trajectory 605 and placing the moving object 604 at a fixed pose 607 in an immovable object 606. The demonstration may be related to an assembly operation involving the moving object 604.

According to an embodiment, the human operator 600 may direct the robot 602 to track the original trajectory 605 by means of a teaching pendant 601 that stores coordinates of via points corresponding to the original trajectory 605 in a memory of the robot 602. The teaching pendant 601 may be a remote-control device. The remote-control device may be configured to transmit robot configurations settings (i.e. the settings of the robot) to the robot 602 for demonstrating the original trajectory 605. For instance, the remote-control device sends control commands such as move to XYZ direction, velocity control commands, joint position commands, and the like, for demonstrating the original trajectory 605. In an alternate embodiment, the human operator 600 can direct the robot 602 by means of the joystick, through kinesthetic feedback, and the like. The human operator 600 may direct the robot 602 to track the original trajectory 605 multiple times for the same fixed pose 607 of the immovable object 606.

The robot 602 may be coupled with or include a controller 602a, such as the controller 101 discussed in previous embodiments. The controller 602a includes a memory, that may store DMPs associated with the original trajectory 605 on the basis of the demonstration. These DMPs may include a forcing function which is learned based on the demonstration of the original trajectory 605 by the human operator 600. To that end, the DMPs of the original trajectory correspond to the set of DMPs 104 shown in previous figures, specifically, FIG. 1B. The original trajectory 605 may include a plurality of original spatial points between a start pose and an end pose of the robot 602. Further, the original trajectory 605 may be generated based on the demonstration corresponding to the task to be performed in a first set of conditions. However, while performing the task, a second set of conditions or a different environment may be observed by the robot 602. It should be noted that the second set of conditions may differ from the first set of conditions.

Figure 6B:
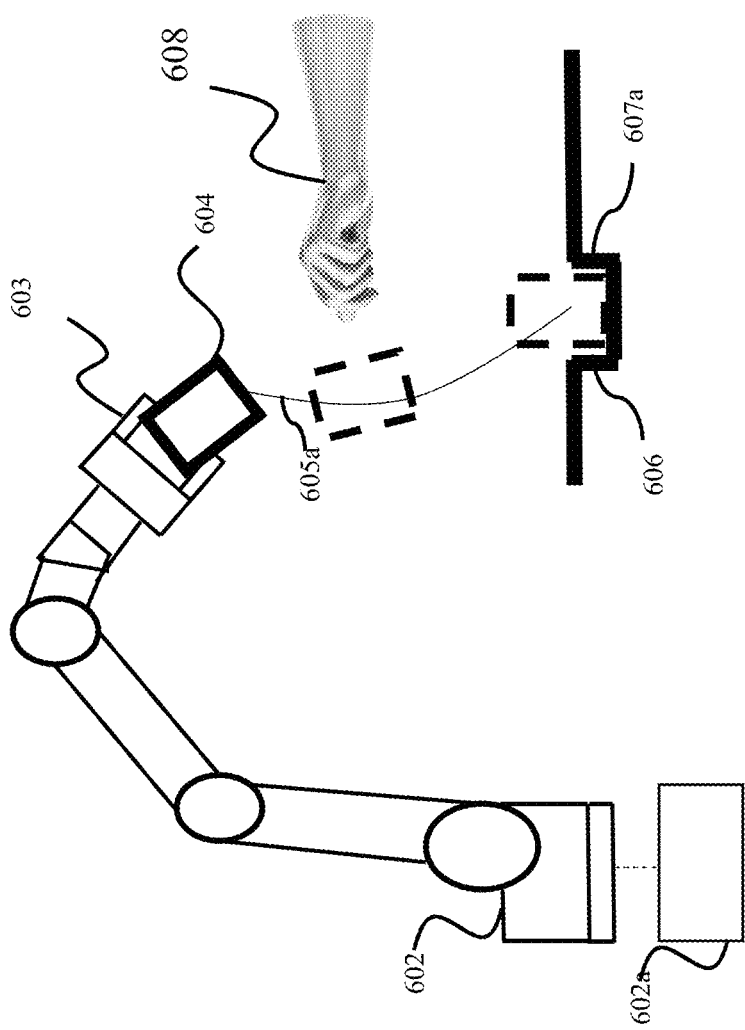
FIG. 6B illustrates a schematic of a use case of a robot system based on the controller of FIG. 1A in a second set of conditions, in accordance with an embodiment of the present disclosure.

FIG. 6B illustrates and example of operation of the robot 602 in a different environment as compared to the environment of FIG. 6A, having a second set of conditions. The second set of conditions may include an operational constraint, which forms a novel task constraint for the environment of FIG. 6B, related to an obstacle 608 in the path of the original trajectory 605. The location and the configuration of the obstacle 608 may be determined using one or more sensors, such as a vision sensor. To this end, a location and a configuration associated with the obstacles 608 present in the environment of the robot 602 in the second set of conditions may be obtained.

In this scenario, first the controller 602a may obtain the set of DMPs stored in the memory that were obtained using demonstration in FIG. 6A. The controller 602a may further be configured to transform the obtained set of DMPs to a set of CDMPs, by using the operational constraint of obstacle avoidance for the obstacle 608 in the original trajectory 605. The transformation may be done using the transformation 115 described in previous embodiments. To that end, one or more predefined weights associated with the original trajectory may be optimized using the one or more differentiable functions related to the operational constraints.

Further, the controller 602a may then dynamically generate a new trajectory 605a based on the one or more predefined weights configured in the second configuration. The new trajectory 605a may include a plurality of new spatial points between the start pose and the end pose. It should be further noted that at least one of the plurality of new spatial points may be different from the plurality of original spatial points.

To that end, generating the new trajectory 605a may include formulating a non-linear dynamic constrained optimization problem, such as the non-linear optimization problem 118 described in previous embodiments, using the one or more predefined weights of the original trajectory and the one or more differentiable functions corresponding to the one or more novel task constraints. Further, generating the new trajectory may include solving the non-linear dynamic constrained optimization problem by optimizing the one or more predefined weights for a radial basis function to generate the new trajectory 605a. The new trajectory 605a satisfies the one or more novel task constraints for performing the task. To that end, determining the new trajectory 605a comprises determining correction terms modifying at least some of the weights of the forcing function such that the DMPs having the forcing function with corrected weights represents a new feasible trajectory satisfying the operational constraints. The new feasible trajectory allows the robot 602 to operate smoothly in an environment different from the original environment, and also safely navigating any obstacles along the new trajectory 605a.

Further, in the event of a change of the environment of the robot 602, the object 604 being manipulated by the robot 602 may be outside its reach, and that may be defined by physical constraints on the structure of the robot 602.

To that end, the set of CDMPs are thus used to solve the non-linear optimization problem for satisfaction of the operational constraint of obstacle avoidance. The solution of the non-linear optimization problem is then be used to determine the new trajectory 605a for placement of the object 604 in the immovable object 606. The end effectors of the robot 602 may then generate control inputs that cause the gripper 603 to follow the new trajectory 605a and place the object 604 successfully in a new goal pose 607a within the immovable object 606.

Thus, without additional learning computational burden, the robot 602 operated using the controller 602a is able to perform successful and safe task completion. The robot 602 is able to adapt to different types of environments by transformation of the DMPs to the CDMPs without spending extra learning and demonstration costs, and by re-configuring naturally, the weights of the basis functions, and solving a non-linear optimization problem using any know off-the-shelf solvers. Additionally, the robot 602 is able to achieve more safety as compared to DMP based task execution, due to enforcement and satisfaction guarantees on constraints, as defined in the transformed CDMP formulations disclosed herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

As will be also appreciated, the above-described techniques may take the form of computer or controller implemented processes and apparatuses for practicing these processes. The disclosure can also be embodied in the form of computer program code containing instructions embodied in tangible media, such as floppy disk cassettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

The disclosed methods and systems may be implemented on a conventional or a general-purpose computer system, such as a personal computer (PC) or server computer. It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, the references to specific functional units are only to be seen as references to suitable means for providing the described functionality, rather than indicative of a strict logical or physical structure or organization.

It may be understood that a robot, without the classifications "physical", "real", or "real-world", this could mean a physical robot system, or a robot simulator which aims to faithfully simulate the behavior of the physical robot system. A robot simulator is a program consisting of a collection of algorithms based on mathematical formulas to simulate a real-world robot's kinematics and dynamics. In the preferred embodiment the robot simulator also simulates the robot controller. A robot simulator may generate data for 2D or 3D visualization of the robot, which may be output to the display device via a display interface.

The above description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

The invention claimed is:

1. A method of controlling a robot for executing a task, wherein the method uses a processor coupled to memory storing a set of dynamic movement primitives (DMPs) parameterized for the task, wherein the set of DMPs comprise a set of at least two dynamical systems, the set of the at least two dynamical systems comprising at least: a function representing point attractor dynamics associated with the task and a learned forcing function encoding motion characteristics from a demonstration of the task, the processor is coupled with stored instructions which when executed by the processor carry out steps of the method, comprising:
obtaining the set of DMPs associated with the task;
transforming, the obtained set of DMPs to a set of constrained DMPs (CDMPs) by defining a perturbation function that modifies the learned forcing function based on a set of operational constraints that need to be satisfied for performance of the task;
solving, a non-linear optimization problem to determine the perturbation function for the set of CDMPs such that the learned forcing function is adjusted minimally while satisfying the set of operational constraints; and generating, a control input causing the robot to execute the task, wherein the control input is computed based on the modified forcing function incorporating the perturbation function determined by the optimization problem.

2. The method of claim 1, wherein the set of at least two dynamical systems comprises a combination of ordinary differential equations (ODEs) representing each dynamical system in the set of at least two dynamical systems.

3. The method of claim 1, wherein the function of point attractor dynamics comprises parameters associated with a start pose of the robot and a goal pose of the robot.

4. The method of claim 1, wherein the learned forcing function comprises one or more weights corresponding to a set of basis functions associated with the task, such that the one or more weights are adjustable parameters associated with the demonstration of the task.

5. The method of claim 4, wherein the one or more weights are learned by solving a locally weighted regression to learn the one or more weights for the basis functions.

6. The method of claim 1, wherein transforming the set of DMPs to the set of CDMPs by defining the perturbation function comprises:
adding an additional set of parameters representing the operational constraints in the learned forcing function to define the perturbation function, wherein novel task constraints are represented using the additional set of parameters as barrier functions which are at least once differentiable.

7. The method of claim 6, wherein solving the non-linear optimization problem comprises:
determining a feasible set of values for the additional set of parameters such that the novel task constraints represented by the barrier functions are satisfied during performance of the task.

8. The method of claim 7, further comprising:
determining the solution of the non-linear optimization problem by finding the feasible set of values for the barrier functions representing the novel task constraints;
determining the perturbation function based on the determined solution of the non-linear optimization problem;
generating the control inputs for controlling the robot based on the determined perturbation function; and
controlling the robot to perform the task based on the generated control inputs.

9. The method of claim 1, wherein the task comprises operating the robot to follow a trajectory.

10. The method of claim 1, wherein the one or more operational constraints comprise at least one of:
an avoidance of a collision with one or multiple obstacles present in an environment of the robot;
an avoidance of a self-collision; and
a joint limit of an end effector of the robot.

11. A controller for controlling an operation of a robot to execute a task, the controller comprising:
a memory configured to:
store a set of dynamic movement primitives (DMPs) parameterized for the task, wherein the set of DMPs comprise a set of at least two dynamical systems, the set of the at least two dynamical systems comprising at least:
a function representing point attractor dynamics associated with the task; and
a learned forcing function encoding motion characteristics from a demonstration of the task;
a processor configured to:
transform, the set of DMPs to a set of constrained DMPs (CDMPs) by determining a perturbation function that modifies the learned forcing function based on a set of operational constraints that need to be satisfied for the execution of the task;
solve, a non-linear optimization problem to determine the perturbation function for the set of CDMPs such that the learned forcing function is adjusted minimally while satisfying the set of operational constraints; and
generate, a control input causing the robot to execute the task, wherein the control input is computed based on the modified forcing function incorporating the perturbation function determined by the optimization problem; and
an output interface configured to command the robot to execute the generated control input to execute the task.

12. The controller of claim 11, wherein the set of at least two dynamical systems comprises a combination of ordinary differential equations (ODEs) representing each dynamical system in the set of at least two dynamical systems.

13. The controller of claim 11, wherein the function of point attractor dynamics comprises parameters associated with a start pose of the robot and a goal pose of the robot.

14. The controller of claim 11, wherein the learned forcing function comprises one or more weights corresponding to a set of basis functions associated with the task, such that the one or more weights are adjustable parameters associated with the demonstration of the task.

15. The controller of claim 14, wherein the one or more weights are learned by solving a locally weighted regression to learn the one or more weights for the basis functions.

16. The controller of claim 11, wherein to transform the set of DMPs to the set of CDMPs by determining the perturbation function, the processor is configured to:
add an additional set of parameters representing the operational constraints in the learned forcing function to define the perturbation function, wherein novel task constraints are represented using the additional set of parameters as barrier functions which are at least once differentiable.

17. The controller of claim 16, wherein to solve the non-linear optimization problem, the processor is configured to:
determine a feasible set of values for the additional set of parameters such that the novel task constraints represented by the barrier functions are satisfied during performance of the task.

18. The controller of claim 17, wherein the processor is further configured to:
determine the solution of the non-linear optimization problem by finding the feasible set of parameters for the barrier functions representing the novel task constraints;
determine the perturbation function based on the determined solution of the non-linear optimization problem;
generate the control input for controlling the robot based on the determined perturbation function; and
output the control input to control the robot to execute the task based on the generated control input.

19. The controller of claim 11, wherein the task comprises operating the robot to follow a trajectory.

20. The controller of claim 11, wherein the one or more operational constraints comprise at least one of:

an avoidance of a collision with one or multiple obstacles present in an environment of the robot;

an avoidance of a self-collision; and a joint limit of an end effector of the robot.

21. A non-transitory computer-readable medium storing computer-executable instructions for executing a task by a robot, the computer-executable instructions configured for:

obtaining a set of dynamic DMPs parameterized for the task, wherein the obtained set of DMPs comprises a set of at least two dynamical systems, the set of the at least two dynamical systems comprising at least: a function representing point attractor dynamics associated with the task, and a learned forcing function a encoding motion characteristics from a learned demonstration of the task;

transforming, the obtained set of DMPs to a set of constrained DMPs (CDMPs) by defining a perturbation function that modifies the learned forcing function based on a set of operational constraints that need to be satisfied for performance of the task;

solving, a non-linear optimization problem to determine the perturbation function for the set of CDMPs such that the learned forcing function is adjusted minimally while satisfying the set of operational constraints; and generating, a control input causing the robot to execute the task, wherein the control input is computed based on the modified forcing function incorporating the perturbation function determined by the optimization problem.

* * * * *